Nov. 4, 1969          P. SIMON          3,476,166
SPIKE FOR VEHICLE TIRES AND METHOD OF PRODUCING THE SAME
Filed Nov. 21, 1967
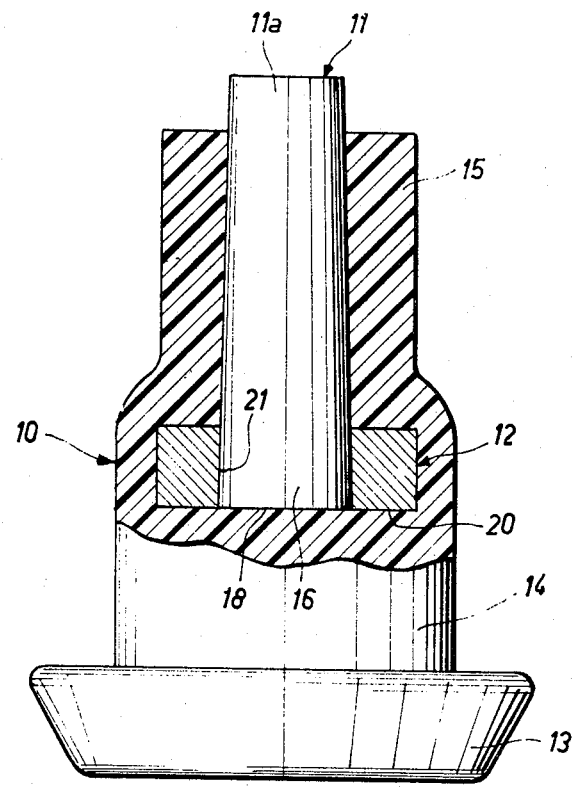
Inventor:
Peter Simon
by Michael S. Shiker
Attorney

United States Patent Office 3,476,166
Patented Nov. 4, 1969

3,476,166
SPIKE FOR VEHICLE TIRES AND METHOD OF PRODUCING THE SAME
Peter Simon, Schramberg, Germany, assignor to Karl Simon, Schramberg, Germany
Filed Nov. 21, 1967, Ser. No. 684,854
Claims priority, application Germany, Dec. 5, 1966, S 107,264
Int. Cl. B60c 11/16
U.S. Cl. 152—210                                    17 Claims

ABSTRACT OF THE DISCLOSURE

A spike for enhancing the traction of tires on road surfaces comprises a pin of hard metal which tapers in a direction from the one toward the other end, a flat ring-shaped socket which is fixed to and surrounds the one end of the pin, and an envelope of polyamide which surrounds the socket and all but the other end of the pin and can be embedded in the material of a tire. The pin is press-fitted into the socket and is permanently bonded thereto by means of metallic solder or by a layer of heat-hardened synthetic plastic material.

Background of the invention

The present invention relates to improvements in spikes which are used in certain types of tires to enhance traction on a road surface.

Spikes are often used in tires of automotive vehicles to improve traction on smooth or ice-covered road surfaces. Such spikes normally comprise a metallic pin which is embedded in a plastic envelope or jacket so that one of its ends extends slightly from the envelope, and the envelope is incorporated into the material of the tire. Proper anchoring of the envelope in the tire presents no serious problems; however, proper fastening of the pin in the envelope is much more difficult and all such presently known proposals which are known to me fail to provide a satisfactory solution which insures adequate retention of the pin.

In accordance with a known proposal, the envelope consists of Delrin (trademark). The pin consists of hard metallic material and its external surface is provided with milled or knurled notches to enhance its retention in the material of the envelope. However, and since the envelope wears away much more rapidly than the pin, the latter is likely to be ejected after a relatively short period of use in a tire.

It is also known to make the envelope of polyamide and to provide the external surface of the pin with notches surrounded by the material of the envelope. However, polyamide tends to collect moisture when the tire is in use and becomes softer so that the bond between the envelope and the pin is weakened and the pin is likely to be ejected by centrifugal force.

Summary of the invention

It is an object of my invention to provide a novel and improved spike for use in tires of trucks and/or other types of automotive vehicles to enhance traction on road surfaces and to construct and assemble the spike in such a way that the pin remains adequately anchored in the material of the envelope.

Another object of the invention is to provide a spike wherein the pin is anchored in such a way that it cannot be ejected even if the material of the jacket softens.

A further object of the invention is to provide a novel method of producing a spike of the just outlined character.

An additional object of the invention is to provide a spike which employs a lightweight pin.

Still another object of the invention is to provide a spike wherein the envelope is subjected to lesser mechanical stresses than in presently known spikes.

The improved spike comprises a metallic pin having a first end portion and a second end portion and preferably tapering in a direction from the second toward the first end portion, a metallic socket fixedly secured to and surrounding the pin in a region remote from the first end portion, preferably in such a way that it surrounds the second end portion, and a plastic envelope or jacket which preferably consists of polyamide and surrounds the socket and all but the first end portion of the pin. The socket preferably resembles a flat ring of circular outline having a flat end face which is flush with the flat end face of the second end portion.

The method of producing the improved spike preferably comprises coating the external surface of the pin and/or the internal surface of the socket with a layer of fusible alloy or with a layer of heat-hardenable plastic bonding material, forcibly introducing the pin into the socket, heating the layer for a short period of time to the melting point of the fusible alloy or to hardening temperature of the plastic layer, and embedding the resulting assembly in a plastic material to form the envelope. The latter preferably comprises a dished head remote from the first end portion of the pin, a cylindrical median section which surrounds the socket, and a cylindrical front section which surrounds the pin intermediate the first end portion and the socket. The external diameter of the median section is preferably less than the diameter of the head but exceeds the external diameter of the front section.

The novel features which are considered as characteristic of the invention are set forth in particular in the appended claims. The improved spike itself, however, both as to its construction and the method of producing the same, together with additional features and advantages thereof, will be best understood upon perusal of the following detailed description of certain specific embodiments with reference to the accompanying drawing.

Brief description of the drawing

The single figure is a partly elevational and partly axial sectional view of a spike which embodies my invention.

Description of the preferred embodiments

The drawing illustrates a spike which comprises a pin 11 of circular outline having a front end portion 11a and a rear end portion 16 provided with a flat end face 18, a flat-ring shaped socket 12 of circular outline which surrounds the end portion 16 and has a flat end face 20 remote from the end portion 11a and located in the plane of the end face 18, and a plastic envelope or jacket 10 which is coaxial with the socket 12 and pin 11 and comprises a substantially dish-shaped or conical rear section or head 13 remote from the end portion 11a, a cylindrical median section 14 which surrounds the socket 12, and a cylindrical front section 15 which surrounds the pin 11 between the front end portion 11a and the socket 12. The pin 11 tapers in a direction from the end portion 16 toward the end portion 11a, i.e., it resembles the frustum of an elongated cone. The material of the pin 11 is a hard metal, preferably a sintered metal.

The purpose of the envelope 10 is to facilitate anchoring of the spike in the material of a tire (not shown). At the present time, I prefer to produce the envelope of polyamide; however, it is clear that the envelope may consist of other suitable plastic material, depending in part on the composition of the material of the tire. The exposed front end portion 11a of the pin 11 comes in contact with the road surface to enhance the traction of the tire, particularly on icy roads. The axial length of the pin 11 is a small fraction of the axial length of the envelope 10; for example, the end face 18 of the rear end portion 16 may be located substantially midway between the axial ends of the envelope or slightly nearer to the head 13. Such compact design of the spike is possible because the rear end portion 16 is pressfitted into and is preferably bonded to the internal surface 21 surrounding the central opening in the socket 12 which latter preferably consists of steel or iron. The external surface of the end portion 16 and/or the internal surface 21 is preferably coated with a layer of fusible alloy, preferably zinc, which is heated at least to a temperature corresponding to its melting point subsequent to forcible insertion of the end portion 16 into the socket 12 so that the alloy melts and, after hardening, provides a very strong and reliable bond between the socket and the pin 11. The application of fusible alloy to the surface of the end portion 16 and/or to the internal surface 21 can take place in a galvanic bath, by chemical deposition or mechanically, for example, in a tumbling drum or the like. The layer of metal is preferably very thin so that the press-fit between the end portion 16 and socket 12 remains intact prior and after heating to effect melting of the layer.

Alternatively, the external surface of the end portion 16 and/or the internal surface 21 may be coated with a layer of heat-hardenable synthetic plastic material (for example, a material which is sold under the name Araldit AT 1U). Such material can be applied to the aforementioned surface or surfaces by mechanical means, e.g., in a drum or the like.

The axial length of the socket 12 is preferably a small fraction of the axial length of the pin 11. In the illustrated embodiment, the axial length of the socket is less than one-fourth of the axial length of the pin, preferably between ⅕ and ⅙ of the axial length of the pin. Furthermore, the external diameter of the socket 12 exceeds considerably the diameter of the end portion 16, this external diameter is preferably 1.5–2.5 times the diameter of the end portion 16.

It was found that the pin 11 is retained in the socket 12 and envelope 10 under circumstances which cause loosening and ejection of pins in conventional spikes after short periods of use. The fact that the envelope may consist of polyamide (for example, nylon) is of no detriment even though such material tends to soften in response to accumulation of moisture, because nylon and like materials exhibit a very satisfactory resistance to wear. Thus, the wear on an envelope which is made of nylon need not exceed the wear on the material of the tire. This enhances the safety of tires which utilize my improved spike.

It was further found that, if the end portion 16 is press-fitted into the socket 12 and particularly if the connection between these parts is enhanced by a layer of fusible alloy or hardenable synthetic plastic material, the connection can readily withstand all such stresses which arise in use including the action of centrifugal force, repeated contact with the road surface, deformation of the tire and/or envelope, and others. Moreover, the assembly including the socket 12 and pin 11 is anchored in the envelope 10 with a force which suffices to safely withstand all expected stresses when the tire is in use. This is attributed to the fact that the external diameter of the inner end of the assembly including the socket 12 and pin 11 exceeds the diameter of its outer end (end portion 11a) so that the assembly cannot be ejected under the action of centrifugal force excepting upon complete destruction of the sections 14 and 15.

The axial length of the socket 12 must suffice to insure retention of the end portion 16 in its opening under all circumstances which arise when the tire is in use. On the other hand, and since the parts 11, 12 consist of metal, it is desirable to reduce the dimensions of the socket 12 to a minimum in order to reduce the weight of the spike, i.e., to reduce the centrifugal force which acts on the spike when the tire rotates. Moreover, it is often undesirable to form the envelope 10 with a large-diameter section 14 and/or 15. The aforementioned ratios between the axial lengths of the socket 12 and pin 11 were found to be very satisfactory to keep the weight of the spike to a minimum but to insure satisfactory retention of the pin therein. The fact that the axial length of the pin 11 is a small fracion of the axial length of the envelope 10 also contributes to a reduction in the weight of the spike.

The envelope 10 may be formed by injection molding, by pouring plasticized synthetic material into a mold which accommodates the socket 12 and pin 11, or in accordance with another suitable process.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adapations should and are intended to be comprehended within the meaning and range of equivalence of the claims.

What is claimed as new and desired to be protected by Letters Patent is set forth in the appended claims:

1. A spike for enhancing the traction of tires on road surfaces, comprising a metallic pin having a first end portion and a second end portion; a metallic socket fixedly secured to and surrounding said pin in a region remote from said first end portion; and a plastic envelope surrounding said pin and said socket, said first end portion of said pin being located outside of said envelope.

2. A spike as defined in claim 1, wherein said pin tapers in a direction from said second toward said first end portion thereof.

3. A spike as defined in claim 1, wherein said second end portion of the pin has an end face and said socket has an end face flush with the end face of said second end portion.

4. A spike as defined in claim 1, wherein said socket is a flat ring of substantially circular outline.

5. A spike as defined in claim 1, wherein said socket consists of ferrous material.

6. A spike as defined in claim 1, wherein said envelope is coaxial with said pin and its axial length exceeds considerably the axial length of said pin.

7. A spike as defined in claim 6, wherein said second end portion of the pin has an end face located substantially midway between the axial ends of said envelope.

8. A spike as defined in claim 1, wherein the axial length of said socket is a small fraction of the axial length of said pin.

9. A spike as defined in claim 8, wherein the axial length of said pin is at least four times the axial length of said socket.

10. A spike as defined in claim 1, wherein the outer diameter of said socket exceeds substantially the diameter of the second end portion of said pin.

11. A spike as defined in claim 10, wherein said outer diameter is 1.5–2.5 times the diameter of said second end portion and wherein said second end portion is fixedly received in said socket.

12. A spike as defined in claim 1, wherein said socket has a flat end face at its end which is remote from the first end portion of said pin.

13. A spike as defined in claim 1, wherein said envelope has a larger-diameter head remote from the first end portion of said pin, a median section surrounding said socket, and a front section surrounding said pin intermediate said socket and said first end portion, the outer diameter of said median section being less than the diameter of said head but exceeding the outer diameter of said front section.

14. A spike as defined in claim 1, wherein said envelope consists of polyamide.

15. A spike as defined in claim 1, wherein said pin consists of sintered metal and has a smooth peripheral surface.

16. A spike as defined in claim 1, wherein said socket has an opening and said pin is press-fitted into said opening.

17. A spike as defined in claim 16, wherein said pin is bonded to said socket.

References Cited
UNITED STATES PATENTS

| | | | |
|---|---|---|---|
| 3,186,466 | 6/1965 | Keinanen | 152—210 |
| 3,301,300 | 1/1967 | Natter | 152—210 |

ARTHUR L. LA POINT, Primary Examiner

C. B. LYON, Assistant Examiner